United States Patent [19]

Moure

[11] 4,195,436
[45] Apr. 1, 1980

[54] APPARATUS FOR TRAPPING CRUSTACEANS

[76] Inventor: José Moure, 2800 SW. 25 Terr., Miami, Fla. 33133

[21] Appl. No.: 935,524

[22] Filed: Aug. 21, 1978

[51] Int. Cl.$^2$ .............................................. A01K 69/00
[52] U.S. Cl. .................................................... 43/100
[58] Field of Search ........................... 43/100, 102, 103

[56] References Cited

U.S. PATENT DOCUMENTS

| 492,123 | 2/1893 | Tinsley | 43/100 |
| 878,820 | 2/1908 | Murdoch | 43/100 |
| 918,058 | 4/1909 | Jumisko | 43/100 |
| 2,603,030 | 7/1952 | Pape | 43/100 |
| 3,821,861 | 7/1974 | Jalbert | 43/100 |
| 3,826,032 | 7/1974 | Torngren | 43/100 |
| 3,906,655 | 9/1975 | Lowenthal | 43/100 |
| 3,992,804 | 11/1976 | Senese | 43/100 |

FOREIGN PATENT DOCUMENTS

| 1483810 | 5/1967 | France | 43/100 |
| 1565630 | 3/1969 | France | 43/100 |

Primary Examiner—Othell M. Simpson
Assistant Examiner—J. T. Zatarga
Attorney, Agent, or Firm—Jesus Sanchelima

[57] ABSTRACT

A trap for crustaceans capable of being knocked down to basic parts occupying a small volume and easy to assemble in little time. Also, sturdy enough to withstand handling, ship movement and underwater currents but at the same time being biodegradable in order to prevent it from becoming a perpetual crustaceans killing trap in the event that the buoy breaks off.

8 Claims, 11 Drawing Figures

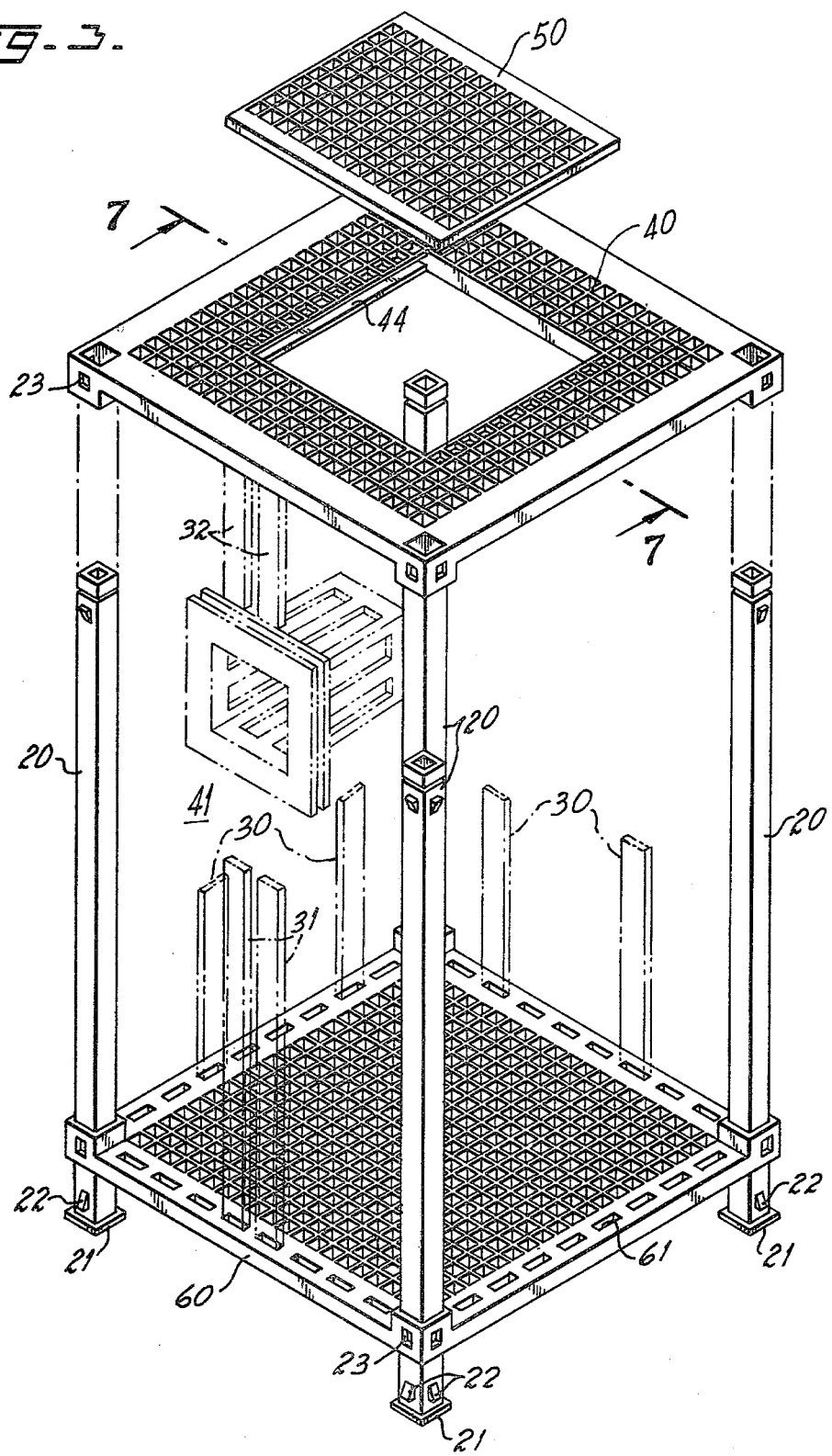

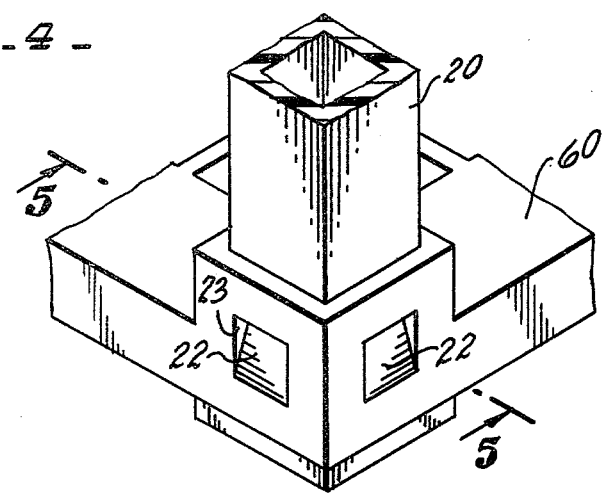
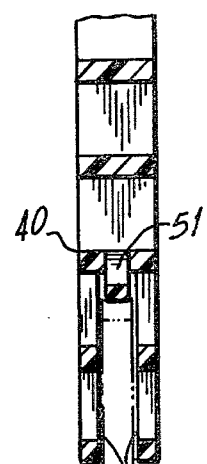
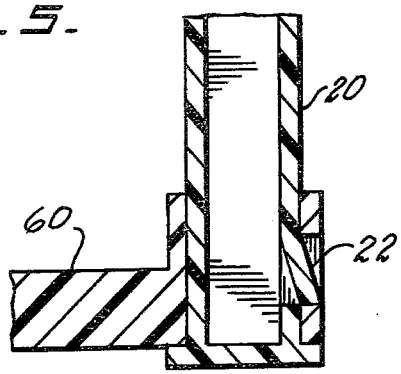
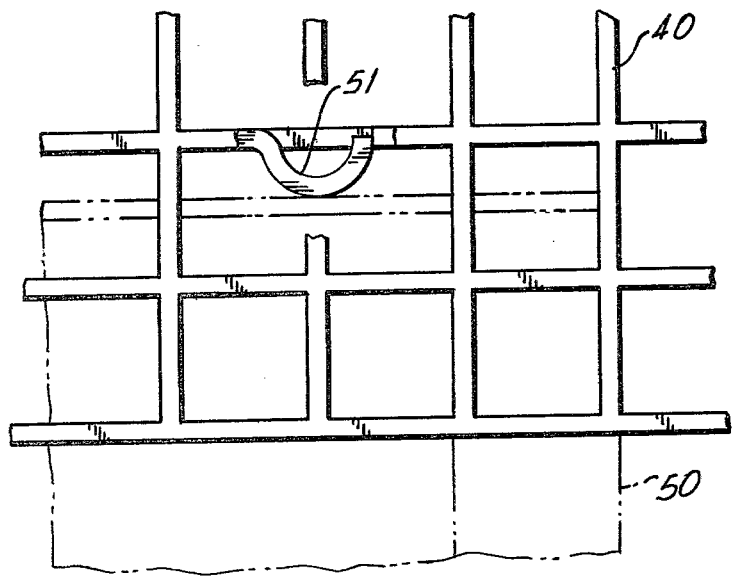
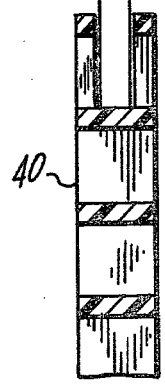

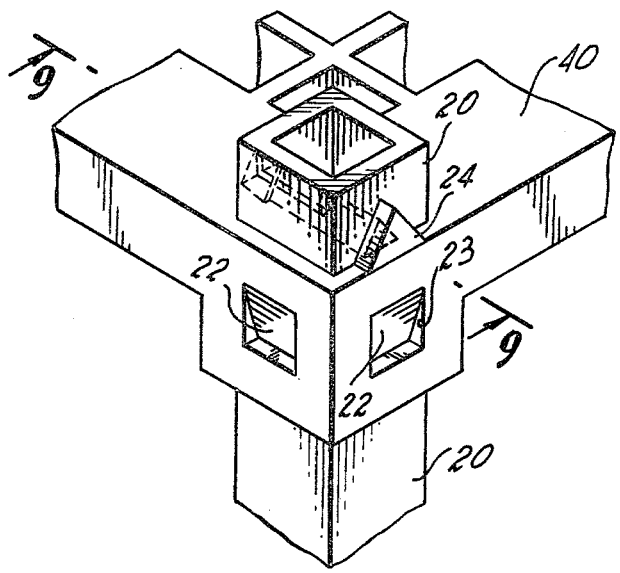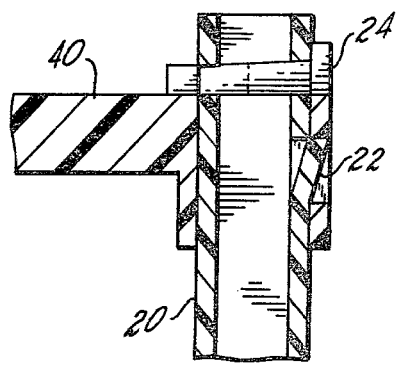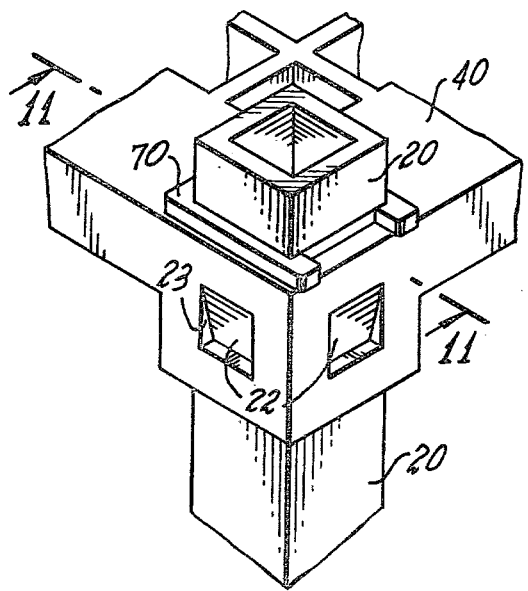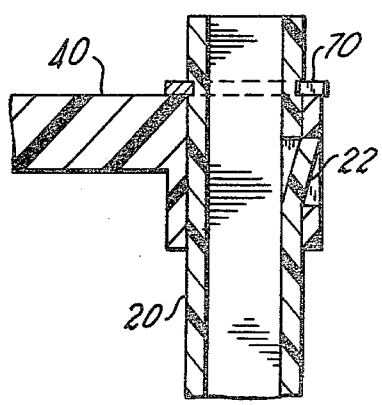

APPARATUS FOR TRAPPING CRUSTACEANS

BACKGROUND OF THE INVENTION

1. Field of the Invention

This invention relates to a light, sturdy crustaceans trap capable of being disassembled and its parts capable of being stored occupying a very small space. It is the small space required for storage and simplicity of construction that makes this invention attractive for fishermen since they have limited amount of space available in their ships. Also, since the component parts are standard for all traps and interchangeable, the repair of these traps is a simple operation.

2. Description of the Prior Art

Many types of traps are in existence now but none of them provide the features of the present invention while at the same time observing the pertinent regulations protecting the ecological balance.

U.S. Pat. No. 3,708,905 issued to Donald A. Jalbert in 1973 describes and claims a lobster trap made out of plastic in its entirety and not capable of being readily disassembled in order to save storage space. Being made out of plastic entirely, this trap will not be accepted in many states that require the traps to be biodegradable to insure the elimination of the probability of creating a perpetual crustaceans killing trap.

U.S. Pat. No. 3,906,655 issued to Walter S. Lowenthal, Jr. provides for an all plastic trap capable of being disassembled. However, the component parts after disassembling are considerably larger than in the present invention thereby limiting its capability of saving storage space aboard a ship. Also, Lowenthal's patent describes and claims a rather complicated and expensive trap and its components are not interchangeable making it difficult to repair.

Other U.S. patents considered by applicant as relevant in establishing the prior art include U.S. Pat. Nos. 3,821,861; 3,045,386; 3,852,908; 2,516,658 and 3,826,032.

BRIEF SUMMARY OF THE INVENTION

The object of the present invention is to provide a crustaceans trap capable of being easily disassembled and stored in a minimum amount of space. By minimizing the storage space it is possible to increase the number of traps that a fishing boat can carry thereby improving its efficiency. It is also an object of this invention to provide a light, yet sturdy, trap capable of being manufactured in large quantities at a low cost by using interchangeable standard parts. It is a further object of this invention to provide a trap that can be fixed fast if it is damaged since the only thing that the fishermen has to do is replace the particular component that was damaged.

BRIEF DESCRIPTION OF THE DRAWINGS

Further details are explained below with the help of the examples illustrated in the attached drawings in which:

FIG. 3 is an exploded view, in perspective, of the trap illustrating the main structural elements.

FIG. 4 is the detailed view, in perspective, showing the engagement of the headed end of the corner column with the side panel that does not have the door frame.

FIG. 5 is a side-cross-section of FIG. 4 along line 5—5'.

FIG. 6 is a partial view of the side panel containing the door frame.

FIG. 7 is a side cross-section of the side panel containing the door frame along line 7—7' in FIG. 3 illustrating the spring loaded lock mechanism.

FIG. 8 is detailed view, in perspective, showing the engagement of the pierced end of the corner column with the square side panel that has the door frame.

FIG. 9 is a cross-section of FIG. 8 along line 9—9' showing the piercing pin and the engagement of the column latch to the side panel wooden members that hold the door frame.

FIG. 10 is a view in perspective similar to FIG. 8, showing a different embodiment, namely, an anchoring clip.

FIG. 11 is a side cross-section of FIG. 10 along lines 11—11', showing in detail the arrangement of the anchoring clip and the corner column's latch.

DETAILED DESCRIPTION OF THE PREFERRED EMBODIMENT

The preferred embodiment of the present invention is described herein with references to elements illustrated in FIGS. 1 through 9. FIGS. 10 and 11 show an alternative embodiment for the corner engagements.

Figure 1:
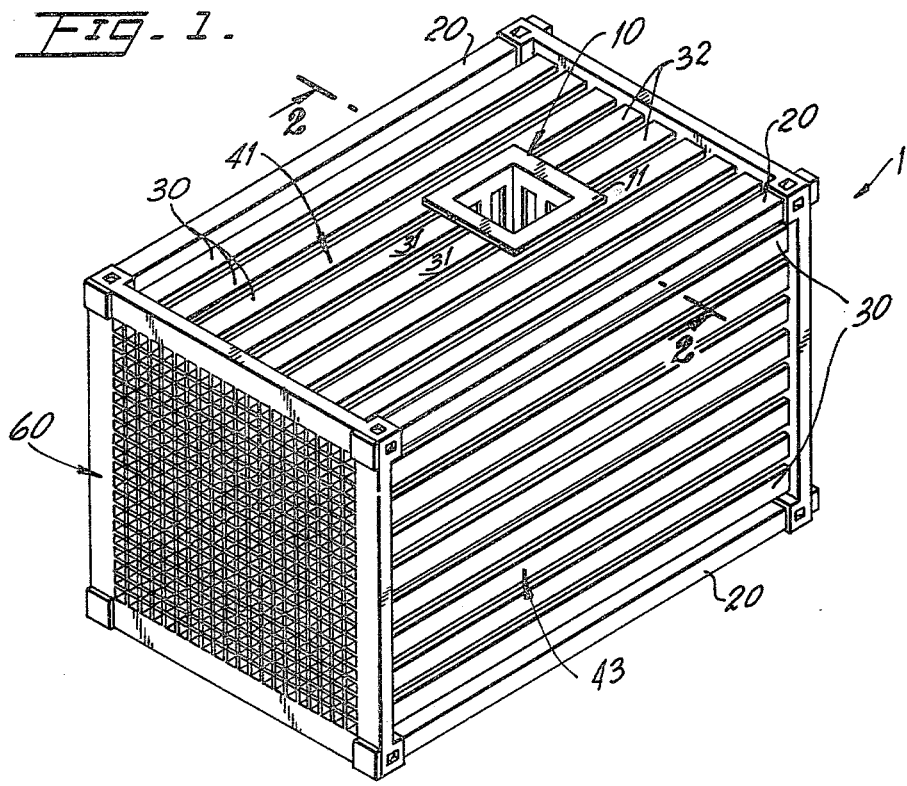
FIG. 1 is a view of the trap, in perspective, lying on its bottom.
Figure 2:
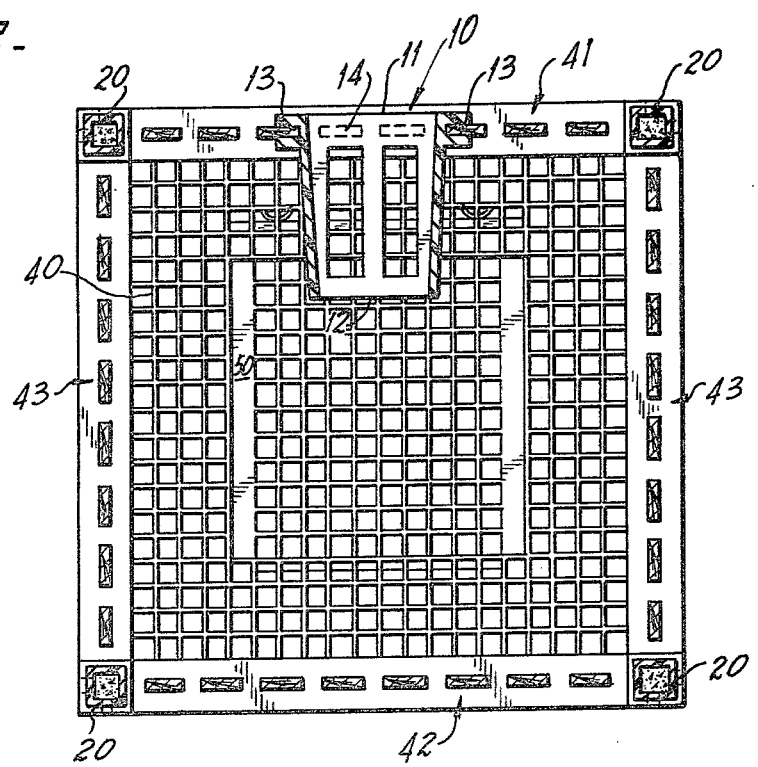
FIG. 2 is a cross sectional view from FIG. 1 illustrating the door frame on one of its side panels.

As shown in FIGS. 1 and 2 the trap consists of six sides; in the preferred embodiment four of these sides are substantially rectangular and two are substantially square. The side that has the mouth trap 10 is referred to as the top 41 and the side opposite to the top 41 is referred to as the bottom 42. The other two rectangular sides 43 are symmetrical. The substantially square sides 40 and 60 in FIGS. 1 and 2 respectively are made out of plastic completely. Side 40 contains the frame for trap door 50 shown in FIG. 3.

In FIG. 1 the crustacean trap 1 of the present invention shows the mouth trap 10 on the top rectangular side composed of wooden members 30. The mouth trap 10 is a molded plastic piece. The shape of the mouth trap 10 is not critical but it should have an outer frame 11 with converging sides substantially perpendicular to said frame 11 narrowing towards the inner frame 12 in order to make it resemble natural orifices which usually have a smaller clearance inside. Also, it will make it more difficult for the crustacean to escape. A net or any other similar structure may also be utilized as a mouth trap with similar results.

The structure of the trap 1 is held together with four corner columns 20 which are hollow and made out of plastic. The two corner columns 20 on the bottom may be filled up with a heavy material, sand or the like, if the user so desires in order to give stability to the trap 1 when it settles on the bottom of the body of water.

FIG. 3 shows an exploded view of the different elements in order to facilitate the understanding of the assembly and construction of the invention. Side panel 60 is pierced through each one of its corners with a corner column 20. Side panel 60 is placed on the floor with all four corner columns 20 held upwardly and engaged by virtue of latch 22 and the corner columns head 21. The latch 22 is a tension loaded locking device integrally formed on corner column 20. The latch 22 can be pressed in with the user's fingers when the corner columns 20 are being slid through the side panel's corner holes. The latch 22 springs back out when the corner column 20 slides all the way in and the head 21 comes into contact with side panel 60. The positioning of the latch 22 is aligned with the latch orifice 23. Once the four corner columns 20 are fastened to the side panel 60, the user proceeds with the insertion of wooden members 30 in its respective holes 61 of side panel 60. The side that holds the mouth trap 10 will be the top 41. On top 41 the wooden members 30 that will hold the mouth trap 10 will have to be slid through the mouth's trap guides 13 before insertion in the side panel's holes 61. After insertion of these two wooden members 30 that hold the mouth trap 10 in place along a vertical axis, the next step consists of inserting wooden members 31 which are smaller than wooden members 30 (wooden members 31 are approximately one half the size of wooden members 30). It is recommendable to work on the top 41 side after all other sides have been completed. Next, wooden members 32 (wooden members 32 are about one half the size of wooden members 31 and about one fourth the size of wooden members 30) are inserted in the trap mouth's holes 14. Finally, side panel with door frame 40 is aligned with the corner columns 20 and wooden members 30 and 32. The corner columns 20 pierce through the corner holes of the side panel with door frame 40. Also, the latches 22 will insure a more rigid structure by springing out through latch holes 23, as shown in FIGS. 3, 8, and 9. Instead of using pin 24, an anchoring clip 70 may be used with the same result as shown on FIG. 10 and FIG. 11. As shown in FIG. 7, plastic side panel 40 contains the guide 44 on which the plastic trap door 50 will slide in and compress the spring loaded lock 51 which will keep the trap door 50 in place.

Side panel 40 may have an attachment (not shown) from which a rope (or other connecting means) is tied and the other end of this rope being tied to a buoy in order to be able to locate the trap. However, the trap may also be used with-out any attachments by simply wrapping the rope around the side panel 40 having the door 50. When the trap 1 is hauled the crustaceans inside will settle on side panel 60, the possibility of escaping is reduced.

It is to be understood that the forms of the invention herewith shown and described are to be taken as preferred examples of the same, and that various changes in the shape, size and arrangement of parts may be resorted to, without departing from the spirit and scope of the invention.

What I claim is:

1. A crustacean trap comprising:
   a. a pair of parallel polygonal side panels, one of these panels having a door frame and a door, said panels having a first hole through each corner of each of said panels and a plurality of latch orifices through the inner walls of said first hole extending outwardly,
   b. a plurality of columns perpendicular to the plane of said pair of parallel side panels said columns being inserted through the respective corner holes of said parallel side panels,
   c. a plurality of latches integrally formed on each column end capable of locking in with said latch orifices,
   d. a plurality of wooden members parallel to said columns inter-connecting said side panels, thereby forming an enclosure,
   e. a trap mouth attached to said wooden members on one side of said enclosure.

2. A crustacean trap as described in claim 1 further comprising means for handling said trap attached to said panel having said door.

3. A crustacean trap as described in claim 2 wherein said plurality of columns include a head on one end and a through opening relatively close to the other end and further including a pin that is inserted through said opening, thereby further securing the columns to said side panels.

4. A crustacean trap as described in claim 2 wherein said plurality of columns include a head on one end and a peripheral groove relatively close to the other end and further comprising an anchoring clip receivable in said groove, thereby further securing the columns to said side panels.

5. A crustacean trap as described in claim 4 wherein said columns are hollow.

6. A crustacean trap as described in claim 5 wherein said parallel side panels are made of plastic.

7. A crustacean trap as described in claim 6 wherein said columns are made out of plastic.

8. A crustacean trap as described in claim 7 wherein said trap mouth is located at about one-third of the distance between said parallel panels away from said panel having said door.

* * * * *